United States Patent Office 3,555,087
Patented Jan. 12, 1971

3,555,087
TEREPHTHALAMIDES
Vincent Gerard Grosso, North Plainfield, and Boydston Lewis Butterfield, East Amwell Township, Hunterdon County, N.J., assignors to American Cyanamid Company, Stamford, Conn., a corporation of Maine
No Drawing. Filed Mar. 27, 1968, Ser. No. 716,319
Int. Cl. C07c *103/30*
U.S. Cl. 260—558
3 Claims

ABSTRACT OF THE DISCLOSURE

Compounds of the formula:

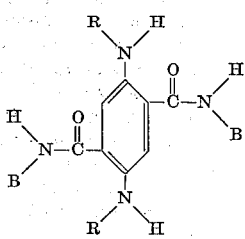

wherein B is hydrogen, alkyl of up to 4 carbon atoms, or benzyl and R is an aromatic radical selected from the group consisting of naphthyl, 9-ethylcarbazyl, quinolyl, pyridyl, and phenyl having up to 2 substituents selected from the group consisting of alkyl of up to 12 carbon atoms, acetamido, chloro, bromo, trifluoromethyl, and methoxy. Useful self colored fluorescent marking compositions are obtained by incorporating the compounds of the foregoing formula in suitable liquid vehicles.

---

This invention relates to the provision of articles having fluorescent surfaces and to the compounds and compositions useful for imparting fluorescent properties to these surfaces. The compounds useful for such purposes are amides of 2,5-diarylaminoterephthalic acids represented by the Formula I:

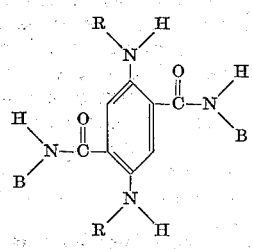

wherein B is hydrogen, alkyl of up to 4 carbon atoms, or benzyl and R is an aromatic radical selected from the group consisting of naphthyl, 9-ethylcarbazyl, pyridyl, and phenyl having up to 2 substituents selected from the group consisting of alkyl of up to 12 carbon atoms, acetamido, chloro, bromo, trifluoromethyl, and methoxy.

It is understood that in the above, the term "aromatic" may designate a phenyl, naphthyl or heterocyclic radical such as quinolyl, pyridyl, etc. which may contain various substituents such as lower-alkyl, lower alkoxy, dilower-alkylamino, halo, nitro, lower(halo alkyl) such as trifluoromethyl, loweralkanamido, e.g., acetamide or the like.

Fluorescence, or the emission by certain materials of light energy of one wavelength when irradiated by "exciting light" of a different and usually lower wavelength, is a well-known phenomenon. Also, well known is the phenomenon of phosphorescence, i.e., persistence of the luminescence after removal of the source of exciting radiation. In the past, various practical applications of fluorescent phenomena have been proposed with varying degrees of success. The importance and the need for organic materials with a variety of visible colors which emit visible light in certian wavelength ranges when excited by ultraviolet light and which are stable, has recently increased. Examples of applications where such properties are useful are numerous. Thus, in the illumination field, screens or panels giving various shades of light under excitation are extremely useful, not only for general illumination, but for producing novel or theatrical effects and signs.

Compounds which fluoresce in desirable shades are further useful in printing inks, paints, enamels and other surface coating compositions where it is desired to have one appearance by daylight or visible light and either a similar or even a completely different appearance or color upon excitation with ultraviolet light.

Ink compositions containing the organic fluorescers are useful for imparting fluorescent properties to various kinds of surfaces in various types of designs, etc. This may be for purposes of decoration, identification or security of documents, etc., and for the prevention of counterfeiting. Thus, for example, if an ink containing a particular fluorescer is used for printing documents, the document may have one appearance when viewed under visible light and a different appearance when viewed under ultraviolet light due to the fluorescent effect of the surface containing the fluorescent material.

However, depending on the fluorescer which is used in the ink for printing the document, the appearance of the printing on the document under ultraviolet excitation may be the same color as that which is visible under ordinary conditions, provided the color of the fluorescence is the same or similar to the visible color of the compound when viewed under visible light. Such ink compositions are thus especially useful for security purposes and counterfeiting detection processes. They are also especially useful for imparting fluorescent properties to various types of surfaces particularly in certain types of designs. These designs may be in the form of printed letters or numerals. The printing with inks containing fluorescent materials may be done using machine-readable format and such applications are extremely important in that these can be used for electronic or mechanized processes involving sensing or scanning devices which sense light of the particular wavelengths of the printed material. Documents which are thus printed could serve as the basis of computerized accounting, billing and recording systems for general business use.

A further example is in marking or identifying documents or items which are to be handled or manipulated mechanically by machines having fluorescence-sensing devices. Thus, items imprinted with printing inks containing fluorescent materials can pass through a fluorescent sensing device which activates mechanical means for manipulating or handling the items automatically. A practical application is in the machine-sorting or positioning of mail. The mail may be marked with fluorescent ink, as such, or the fluorescer may be used in the ink used to imprint the postage stamps. A very useful practical application is in the ink used in a postage meter machine. Thus, if the ink used for postage metering contains the fluorescer, the mail can be sent through a sensing device which can recognize it as having been metered and, in addition, on the basis of the fluorescent marking, can properly position the mail for cancelling.

For such practical purposes fluorescent materials with a wide range of color under normal and ultraviolet lighting conditions, would be useful. In addition, for certain purposes it is especially useful that the color under visible light be of a certain wavelength range in relation to the wavelength range of emitted fluorescent light. For some purposes, it is desired that the fluorescent material be colorless when viewed under visible light and, under UV, emit fluorescent light in a certain color range. For other purposes, however, it is desired that the fluorescent material have a similar color such as bright yellow, orange or red when viewed under either ultraviolet or visible light. Fluorescers with such properties can be used to make up a visibly colored ink which at the same time affords fluorescent properties. Thus, other colored nonfluorescent pigments are not needed to achieve the desired color under either visible or ultraviolet light.

For various purposes it is required that the fluorescence be of a certain color, i.e., within a certain wavelength region. It may be noted that many known compounds fluoresce in the yellow, green, blue or violet region and are colorless under visible light. For use in printing inks which may be applied to paper, fluorescence in a region higher than about 485 millimicrons is necessary if the printing is to be viewed by a photo sensing device since most paper contains organic brighteners or optical bleaching agents which fluoresce in the blue regions. Thus, unless this requirement is met, there is likely to be only a small contrast between the fluorescence of the printing ink and that of the fluorescers used as brighteners in the paper and the machine would have difficulty in distinguishing between printed and background fluorescence.

The present invention is based on the discovery that derivatives of 2,5-diarylaminoterephthalic acid as defined above are useful as organic fluorescers which exhibit bright colors in the yellow, orange and red range when viewed under ultraviolet or visible light.

Thus, in general, the color of the fluorescent light emitted by these compounds in the solid form when excited by UV light is, surprisingly, very similar to the color which they exhibit under visible light. It is noteworthy that the fluorescers of this invention can fluoresce in solid state since not many solid state fluorescers are available.

It should also be noted that though amide derivatives of the substituted 2,5-diarylaminoterephthalic acids are suitable to achieve the desirable visible and fluorescent color characteristics, the acids per se do not fluoresce significantly.

A convenient method for the preparation of the compounds of Formula I involves first the formation of a dialkyl succinylsuccinate by condensation of 2 moles of a dialkyl succinate with 4 moles of a sodium alkylate in a suitable solvent such as xylene. The dialkyl succinylsuccinate is condensed with aniline or an aryl amine followed by oxidation to yield a diarylamino terephthalic ester. The esters are then treated with ammonia or an amine; or alternatively, the ester can be converted through the acid to the acid chloride, which in turn can be reacted with ammonia or an amine. Useful amines correspond to the formula:

wherein B is as defined above.

As stated above, the compositions of this invention may be used in a large variety of applications. Thus, they may be used in lighting panels, in plastic compositions, in inks, paints and other coating compositions, and the like, where a surface of a certain visible color is desirable in addition to emission of visible light of various colors upon exposure to UV light. They may be used in applications both where it is desirable to produce a composition which has one appearance by daylight and a completely different appearance or color under UV light and in compositions where it is desirable to have a given color by daylight and a similar color under UV or black light.

Examples of particularly important applications are in luminescent compositions for identification or machine-sensing purposes. A practical application involves, for example, the use of the fluorescers for the preparation of inks used in detection and sensing systems, for facing and cancellation of stamps or for sorting and positioning for cancellation of pieces of mail. Of special interest is the application in inks for postage metering devices whereby, for example, the metering device imprints the mail item in a certain color with the amount of postage paid; the mail then, when it is among other mail items to be sorted and cancelled when subject to UV light, emits from the imprint, fluorescent light of a given wavelength to activate sensing devices. The compositions of the invention are particularly useful for such a purpose in that the wavelength of fluorescence is definitely distinct from that of brightening agents generally occurring in paper.

As stated above, an application of the solid organic fluorescers of the invention which is of great interest, is in postage meter ink formulations. In such an application, a self-pigmented ink is possible. The solid fluorescers in suspension in the ink vehicle impart visible color, and in addition, without the presence of any other pigment, impart the necessary fluorescent properties to the ink imprint. The fluorescent ink composition, of course, when used on mailing units makes possible the use of mechanical devices for sorting, positioning, cancelling, etc.

Such formulations normally are made up in a drying varnish vehicle using a formulation with mineral spirits which gives an ink with the consistency which is required for the intended purpose.

A combination of components to give a formulation of general application in postage metering equipment, is made up as follows:

25 parts of the organic fluorescer
From 5 to 20 parts of a lithographic varnish of heavy consistency (#1 to #6 Lithographic Varnish)
From 0 to 50 parts of a light viscosity lithographic varnish (#4/0 to #1 Lithographic Varnish)
From 5 to 25 parts of a light viscosity mineral oil The proportion of the heavy and light lithographic varnishes may be adjusted to result in a final consistency suitable for the particular meter in which the ink is to be used. The range of viscosity may vary widely according to the postage meter or other printing device in which the ink is to be used. The ink may be in the form of a comparatively thin liquid or it may even have the consistency of a thick semisolid. Conventional ink materials may be used to achieve the desired viscosity which may range overall from about 5 centipoises as a lower limit, to about 10,000 centipoises as an upper limit. The lithographic varnish is well known in the ink trade.

From 0 to 5 parts of lecithin for each 24 to 25 parts of the fluorescer is sometimes included to improve consistency properties.

In addition, it is sometimes advantageous to include from 0.01 to about 2% of a drying inhibitor such as methyl salicylate. This serves the purpose of inhibiting the drying of the varnish in the mechanical equipment and preventing clogging. After the ink imprint has been made on the item of mail, the inhibitor, such as methyl salicylate, evaporates and the varnish drying effect can proceed rapidly.

The invention is further illustrated by the examples which follow.

EXAMPLE 1

Preparation of the mixed methyl-ethyl esters of substituted 2,5-diarylaminoterephthalic acids A 1 mole portion of the mixed methyl-ethyl ester of, succinylsuccinic acid is reacted with somewhat more than a 2 mole portion (about 10% excess) of the amino compound in xylene at elevated temperatures in the presence of a small amount of acetic acid as an acid catalyst, while simultaneously passing air into the mixture to effect oxidation of the dihydroterephthalic acid derivative as it is formed.

As an example of such a procedure, the following preparation using as the amine, 3-amino-9-ethylcarbazole follows:

To 400 ml. xylene was added 30 grams of the mixed ester (methyl-ethyl) of succinylsuccinic acid, 46 grams of 3-amino-9-ethylcarbazole and 50 ml. of acetic acid. The mixture was heated to 110° C. for three hours during which time air was passed in (1 to 1.5 liters of air per minute). The water formed from the reaction was removed by distillation. As the water was removed, the temperature remained somewhat constant, but as the reaction became complete and all the water was removed, the temperature was allowed to increase to about 125° C. Water was then added to the mixture and the xylene removed by steam distillation. The residue was stirred with 600 ml. 95% ethanol and the solid isolated by filtration, washed and dried. The resulting mixed methyl-ethyl ester of 2,5-bis(9-ethyl-3-carbazolylamino)terephthalic acid, a red solid melting at 240-242° C., shows a red fluorescence.

The above procedure was repeated using a variety of aromatic amines as listed below. In some instances, the ratio of xylene to starting material was varied to obtain complete solution of the starting material. Also in some instances, the steam distillation to remove xylene was not carried out if the product precipitated directly from the mixture. The products may be further purified by recrystallization from xylene or acetic acid.

Using the following amines, additional mixed esters may be prepared by the foregoing procedure:

| | |
|---|---|
| 3-aminoquinoline | 2,5-dichloroaniline |
| o,m and p-toluidine | 3,4-dichloroaniline |
| o and p-anisidine | 2,4-dichloroaniline |
| o,m and p-chloroaniline | 2,3-dichloroaniline |
| p-ethylaniline | 3,5-dichloroaniline |
| p-butylaniline | 4-aminoacetanilide |
| p-dodecylaniline | 3-bromoaniline |
| 2,5-xylidine | 3-trifluoromethylaniline |
| 3,4-xylidine | 3-chloro-4-toluidine |
| 2,4-xylidine | 2-naphthylamine |
| 2,3-xylidine | 1-naphthylamine |
| 3,5-xylidine | |

EXAMPLE 2

Preparation of the diamide of 2,5-di-p-toluidinoterephthalic acid

To 43 grams of the mixed methyl-ethyl ester of 2,5-di-p-toluidinoterephthalic acid prepared in Example 1 and 50 grams of methanol, was added 50 grams of liquid ammonia. The mixture was heated at 120 to 125° C. in a pressure vessel for 5 hours, the pressure rising to 200 p.s.i.g. The mixture was then cooled to room temperature and the solid product isolated by filtration after slurrying in 200 ml. of hot methanol and then recrystallized from dimethylformamide. The product was obtained in the form of light orange crystals melting at 323 to 326° C. Upon exposure to UV light, the product fluoresces a bright orange color. Similarly, other fluorescent diamides are prepared from ammonia and the mixed esters derived from the aromatic amines listed at the end of Example 1.

EXAMPLE 3

Preparation of N,N'-di-n-butylamide of 2,5-di-p-toluidinoterephthalic acid

To 43 grams of the mixed methyl-ethyl ester of 2,5-di-p-toluidinoterephthalic acid and 73 grams of n-butylamine was added 4 grams of ammonium chloride. The mixture was refluxed for 24 hours, cooled and the solid product isolated by filtration and washed with hot water and acetone; recrystallization from acetone resulted in a yellow product melting at 244-245° C. Upon exposure to UV light, the product exhibits a greenish yellow fluorescence.

The corresponding N,N'-di-benzylamide is prepared by a method analogous to that above using an equivalent amount of benzylamine in place of the butylamine. The product, after recrystallization from dimethylformamide, melts at 261-263° C.

EXAMPLE 4

The N,N' - dibenzylamide of 2,5-di-p-toluidinoterephthalic acid prepared as described in Example 3 was incorporated at 5% concentration into a commercial ink vehicle (a transparent lithographic varnish). A drawdown on white paper showed a yellow-orange color. When exposed to fluorescent light from a fluorescent type black light lamp (General Electric, Type F8T5BLB), the drawdown surface exhibited a bright yellow fluorescence.

EXAMPLE 5

Postage meter ink formulation

An ink formulation is prepared using the following components:

25 parts of the N,N'-dibenzylamide of 2,5-di-p-toluidinoterephthalic acid
25 parts of a viscous lithographic varnish (No. 4 Transparent Lithographic Varnish)
1 part of lecithin (Soya Lecithin—Type S)
1 part of methyl salicylate
25 parts of light lithographic varnish (4/0 Lithographic Varnish)
23 parts of light mineral oil (Magie Bros. No. 470 Oil).

The fluorescer, the heavy varnish and lecithin are combined and ground well on a 3-roll ink mill. The methyl salicylate, the light varnish and the light mineral oil, previously blended, are then added. The total formulation is then mixed and blended until uniform.

(The lithographic varnish used in the above formula is a drying type varnish. The methyl salicylate is included as a drying inhibitor to prevent too rapid drying of the varnish.)

The above formulation may be used in postage meters for imprinting mail items with the cancellation and the amount of postage paid. When used in this way, the imprint appears yellow in daylight and when viewed under UV light, it also fluoresces yellow.

EXAMPLE 6

Using the compound of Example 2, fluorescent poly(methylmethacrylate) panels were prepared containing 1%, 3%, 5% and 10% of the fluorescer. For this purpose the solid fluorescer was milled into the poly(methylmethacrylate) which was then compression molded into panels.

These panels in daylight and under UV light appeared colored.

EXAMPLE 7

The diamide of 2,5-di-p-toluidinoterephthalic acid is incorporated at a 10% by weight concentration into polypropylene (Hercules Profax 6501 Polypropylene). Viewed in daylight, the plastic appears orange. It also fluoresces a bright orange color under ultraviolet light.

EXAMPLE 8

A sample of the fluorescer of Example 2 is blended with wool soap in the ratio of one part of ester with 10 parts of soap. The blending is carried out in a Waring blender and the blended material is then compacted into pencil thick crayons by pressing through a tube of appropriate size.

The colored wax crayons give printings with an orange color by daylight and with orange fluorescence viewed under ultraviolet light.

We claim:
1. A compound of the formula:

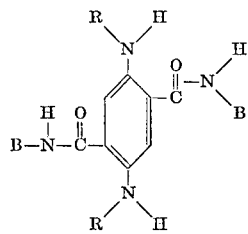

wherein B is hydrogen, alkyl of up to 4 carbon atoms, or benzyl and R is an aromatic radical selected from the group consisting of naphthyl, 9-ethylcarbazyl, quinolyl, pyridyl, and phenyl having up to 2 substituents selected from the group consisting of alkyl of up to 12 carbon atoms, acetamido, chloro, bromo, trifluoromethyl, and methoxy.

2. The compound of claim 1 wherein B is hydrogen.
3. The compound of claim 1 wherein R is p-tolyl.

No references cited.

HENRY R. JILES, Primary Examiner

H. I. MOATZ, Assistant Examiner

U.S. Cl. X.R.

260—315, 295, 295.5, 287, 559; 106—22; 252—301.3